＝US009191241B2

(12) United States Patent
Thevenin et al.

(10) Patent No.: US 9,191,241 B2
(45) Date of Patent: Nov. 17, 2015

(54) METHOD FOR ACQUIRING AND PROCESSING SIGNALS

(71) Applicant: Commissariat à l'énergie atomique at aux énergies alternatives, Paris (FR)

(72) Inventors: Mathieu Thevenin, Saclay (FR); Gwenole Corre, Saint Aubin (FR)

(73) Assignee: COMMISSARIAT A L' ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/383,789

(22) PCT Filed: Mar. 12, 2013

(86) PCT No.: PCT/EP2013/055000
§ 371 (c)(1),
(2) Date: Sep. 8, 2014

(87) PCT Pub. No.: WO2013/135695
PCT Pub. Date: Sep. 19, 2013

(65) Prior Publication Data
US 2015/0110225 A1   Apr. 23, 2015

(30) Foreign Application Priority Data

Mar. 13, 2012  (FR) ..................................... 12 52255

(51) Int. Cl.
*H04L 25/02*      (2006.01)
*G06F 15/80*      (2006.01)
*G06F 9/50*       (2006.01)
(52) U.S. Cl.
CPC .......... *H04L 25/0262* (2013.01); *G06F 9/5066* (2013.01); *G06F 15/8007* (2013.01); *G06F 15/8015* (2013.01)

(58) Field of Classification Search
None
See application file for complete search history.

(56) References Cited

U.S. PATENT DOCUMENTS 5,050,065 A    9/1991  Dartois et al.
7,184,493 B1*  2/2007  Pringle et al. .................. 375/316
(Continued)

FOREIGN PATENT DOCUMENTS

EP    0315529 A1    5/1989
FR    2885758 A1   11/2006
(Continued)

OTHER PUBLICATIONS

International Search Report for PCT/EP2013/055000 dated Jul. 1, 2014.
(Continued)

*Primary Examiner* — Leon-Viet Nguyen
(74) *Attorney, Agent, or Firm* — Pearne & Gordon LLP

(57) ABSTRACT

A signal acquisition and processing method includes a step of acquiring signals in at least two acquisition channels ($A_1, A_2, \ldots, A_N$); a step of detecting the acquired signals in at least two detection channels ($V_1, V_2, \ldots, V_N$) associated respectively with the two acquisition channels; a step of distributing the detected signal or signals that result from the detection step in at least one computing tile available in a set of computing tiles; a step of storing the detected signal or signals in the computing tile or tiles; and a step of processing the signals stored in the computing tile or tiles in order to obtain data characteristic of the detected signals. The method can apply to the acquisition and processing of non-deterministic data (nuclear instrumentation, laser instrumentation, radar detection, etc.).

10 Claims, 10 Drawing Sheets

(56) References Cited

U.S. PATENT DOCUMENTS

2003/0026286 A1* 2/2003 Nakamura .................... 370/442
2010/0039098 A1* 2/2010 Goguillon et al. ......... 324/76.22
2010/0102812 A1* 4/2010 Lustig et al. ................. 324/309
2011/0273459 A1 11/2011 Letellier et al.

FOREIGN PATENT DOCUMENTS

FR  2936626 A1  4/2010
WO  2007/141311 A1  12/2007

OTHER PUBLICATIONS

"Digital Pulse Processing in Nuclear Physics Rev. 3", Aug. 26, 2011, pp. 1-18, retrieved from the internet http://www.caen.it/documents/News/32/WP2081_digitalpuleprocessing_03.pdf.
French Search Report for FR 1252255 dated Jan. 24, 2013.

* cited by examiner

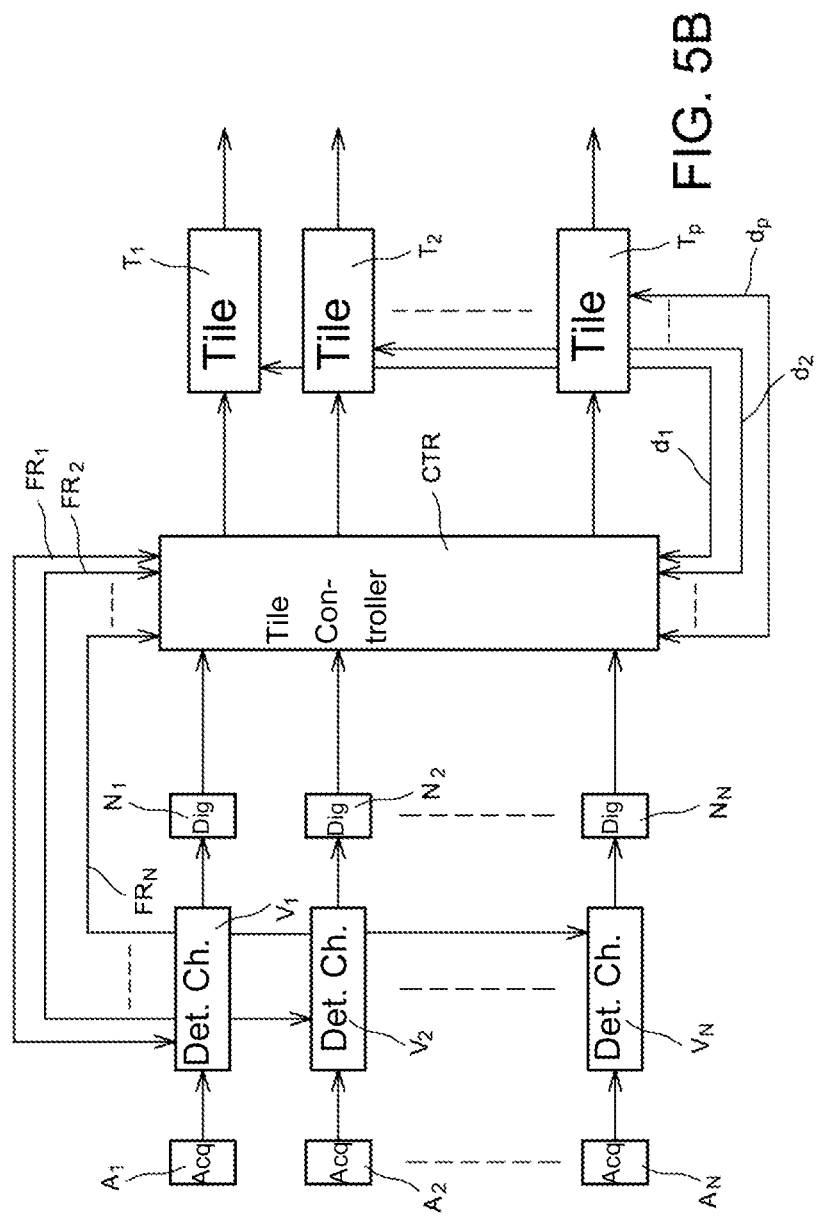

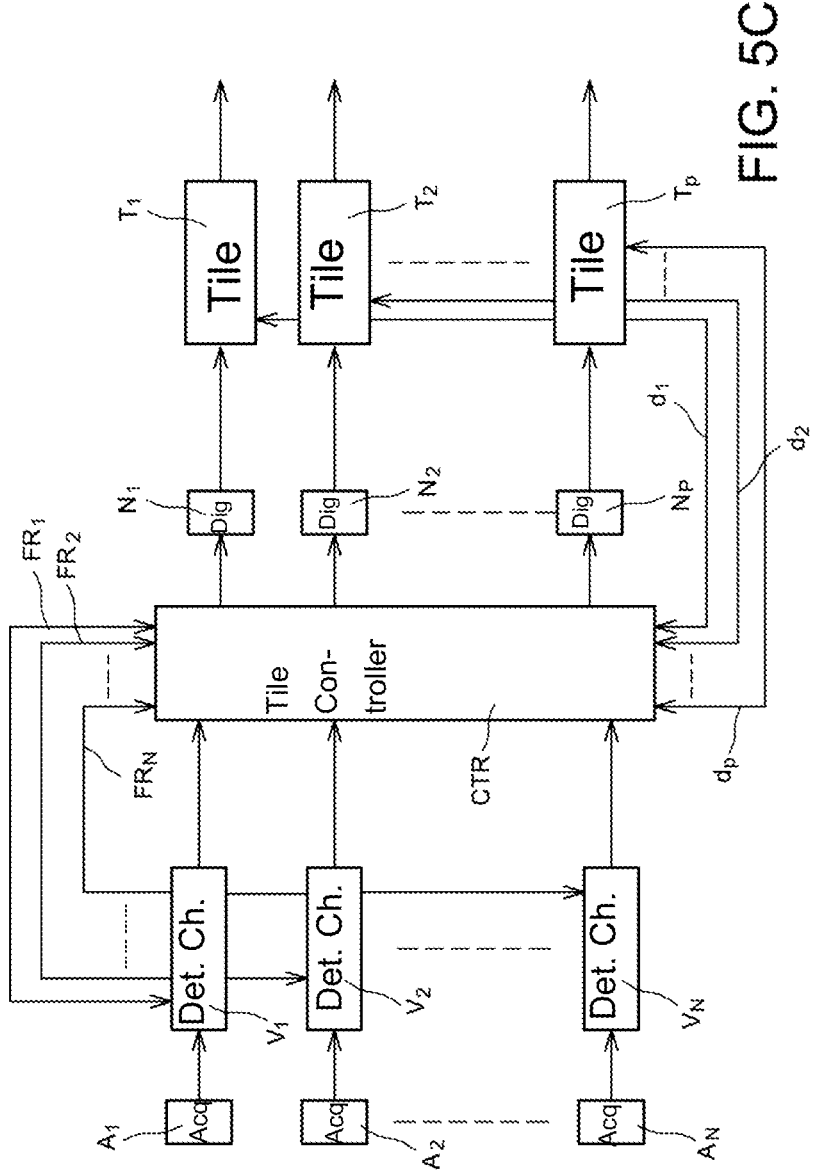

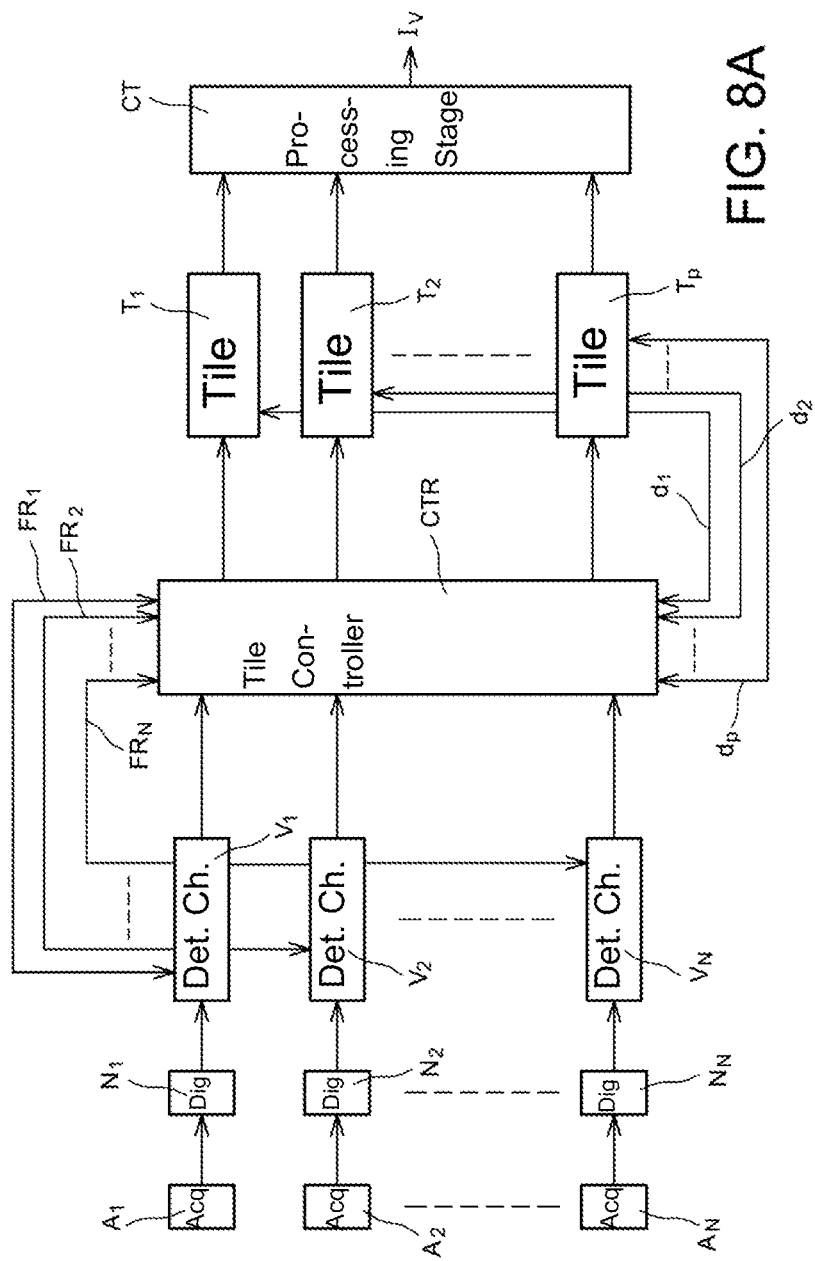

METHOD FOR ACQUIRING AND PROCESSING SIGNALS

TECHNICAL FIELD AND PRIOR ART

The invention concerns a signal acquisition and processing method and, more particularly, a pulse acquisition and processing method.

The invention applies in a particularly advantageous fashion to fields wherein the signals detected are not deterministic, such as, for example the nuclear instrumentation field, the laser instrumentation field, the radar detection field, ultrasound detection, etc.

In the remainder of the description, in order to simplify the presentation of the invention, the signals concerned are pulses. More generally, the invention does however concern any type of signal, pulsed or otherwise.

In the case where the arrival of the pulse is not deterministic, the density of the pulses received is variable, able to vary from a few beats per second to several thousands of beats per second. Processing of the pulses in real time is then difficult to effect. In addition, several reception channels may acquire pulses. It is then often necessary to compare the pulses issuing from these channels, in particular to determine with precision the duration that separates them. The computing capacities required and the nature of the processing operations to be performed may then vary considerably according to the circumstances.

One traditional method for managing the processing of pulses received consists of fixing the processing and carrying it out in analogue. A first drawback of this method is its lack of flexibility. Moreover, a wide range of processing operations cannot be performed with this approach like, for example, processing operations in frequency regime or wavelet processing operations.

In order to overcome the drawbacks related to the use of analogue components, digitising the signals and processing the signals thus digitised by means of dedicated ASIC (Application Specific Integrated Circuit) digital components, FPGA (Field Programmable Gate Array) reconfigurable digital components or DSP (Digital Signal Processor) programmable digital components is known. The use of dedicated components requires fixing the processing operations and makes it possible to make calculations in real time provided that these calculations do not need to be modified or updated during the life of the component. The use of reconfigurable or programmable components allows a greater variety of processing operations but to the detriment of the computing speed. Some pulses may then not be processed.

Another solution is illustrated in FIG. 1. This solution consists of performing the processing offline. The device then comprises an analogue to digital converter 1, a digital component 2, a microcontroller 3, a computer 4 and storage circuits 5. An analogue pulse $S_A$ is converted into a digital pulse $S_N$ by the converter 1 and transmitted, via the digital component 2 and the microcontroller 3, to the storage circuits 5. The data stored in the storage circuits 5 are transferred to the computer 4 via the microcontroller 3. The computer 4 then carries out the required processing. This method advantageously makes it possible to process all the data captured but, however, does not make it possible to obtain results in real time. Moreover, though this method makes it possible to perform processing operations of various natures, since the data remain available, it is however not possible to store and process large volumes of data since the storage circuits have a limited memory space.

The method of the invention does not have the drawbacks of the prior art that are mentioned above.

DISCLOSURE OF THE INVENTION

The invention concerns a signal acquisition and processing method comprising a step of acquiring at least two signals in at least two acquisition channels and a step of detecting the signals acquired by at least two detection channels respectively associated with the acquisition channels, each detection channel delivering a detected signal corresponding to an acquired signal, characterised in that it comprises:

a step of distributing, in at least one available computing tile, in whole or in part, in a set of computing tiles, at least one signal detected by at least one detection channel, the detected signal being distributed in the form of at least one elementary signal in the computing tile or tiles, each elementary signal being accompanied by a time data item that identifies a start time of the elementary signal and a channel data item that identifies the acquisition channel from which the detected signal that corresponds to the elementary signal comes, a step of storing the elementary signal or signals in the computer tile or tiles in the set of computing tiles, and a step of processing the elementary signal or signals stored in the computing tile or tiles in order to obtain characteristic data of the signals detected, each characteristic data item being associated with at least one time data item and at least one channel data item.

According to the preferential embodiment of the invention, the signals are pulses. In a particularly advantageous embodiment, the pulses are events in a set of events obeying a Poisson distribution.

As will be clear in the remainder of the description, the term "elementary signal" applies either to a detected signal taken in its entirety or to a piece or fraction of a detected signal. In the latter case, the same detected signal is divided into several elementary signals, which are distributed in various computing tiles.

According to an additional feature of the invention,
a step of digitising the acquired signals precedes the detection step; or
a step of digitising the detected signals precedes the distribution step; or
a step of digitising the elementary signal or signals precedes the step of storage of the elementary signal or signals in the computer tile or tiles in the set of computing tiles.

According to yet another supplementary feature of the invention, the detected signals are stored in the detection channels.

According to yet another supplementary feature of the invention, a step of supplementary processing of all or some of the characteristic data of the detected signals processes said data according to the time data and/or the channel data that are associated with the characteristic data.

According to yet another supplementary feature of the invention, the supplementary processing step groups together all or some of the characteristic data of the detected signal by detection channel and/or according to time. In a particular embodiment, the supplementary processing step is the construction of a detection histogram for a detection channel and/or according to time.

According to yet another supplementary feature of the invention, a detected signal is stored in the same computing tile in the form of a unique elementary signal.

According to yet another supplementary feature of the invention, when the processing of the elementary signals stored occupies all the computing tiles in the set of computing tiles and at least one supplementary detected signal is delivered by at least one detection channel:
- a current processing in at least one computing tile is interrupted in order to process supplementary elementary stored signals corresponding to the supplementary detected signal, or
- it is chosen not to process the supplementary signal, or
- it is chosen to delay the processing of the supplementary signal until at least one computing tile is wholly or partly available.

According to yet another supplementary feature of the invention, the processing of the elementary signals stored is interrupted in at least one computing tile provided that the duration of said processing exceeds a predefined value or provided that a newly detected signal is considered to have priority, the processing of the newly detected signal being substituted for the interrupted processing.

The method of the invention advantageously makes it possible to process deterministic and non-deterministic events.

"Non-deterministic event" means an event the occurrence and/or intensity and/or density of which does not obey a predictable scheme. The processing of a non-deterministic event is made possible by the method of the invention by virtue of the distribution, in computing tiles, of elementary detected signals that represent this event, each elementary detected signal being accompanied by a time data item that identifies its start time and a channel data item that identifies the channel that detected the event. The elementary signals corresponding to various events can then be processed independently of one another, ensuring availability of the acquisition and processing device for the acquisition and processing of subsequent events. Once the processing operations have been performed in the computing tiles, the signals that result from these processing operations are grouped together according to the channel and time data, allowing a reconstruction—a posteriori—of the useful signals.

More generally, the presence of a channel data item and a time data item for each elementary signal, associated with the capacity of the method of the invention to store the elementary signals, advantageously allows asynchronous processing of the detected events, whether these events be deterministic or non-deterministic.

BRIEF DESCRIPTION OF THE FIGURES

Other features and advantages of the invention will emerge in the light of the following description given with reference to the accompanying figures, among which:

FIGS. 5A-5C show three variants of a signal acquisition and processing device that implements the preferential embodiment of the method of the invention;

FIGS. 8A-8C show three variants of a signal acquisition and processing device in accordance with the device depicted in FIG. 3 and which implements the preferential embodiment of the method of the invention.

In all the figures, the same references designate the same elements.

DETAILED DISCLOSURE OF PREFERENTIAL EMBODIMENTS OF THE INVENTION

Figure 2:
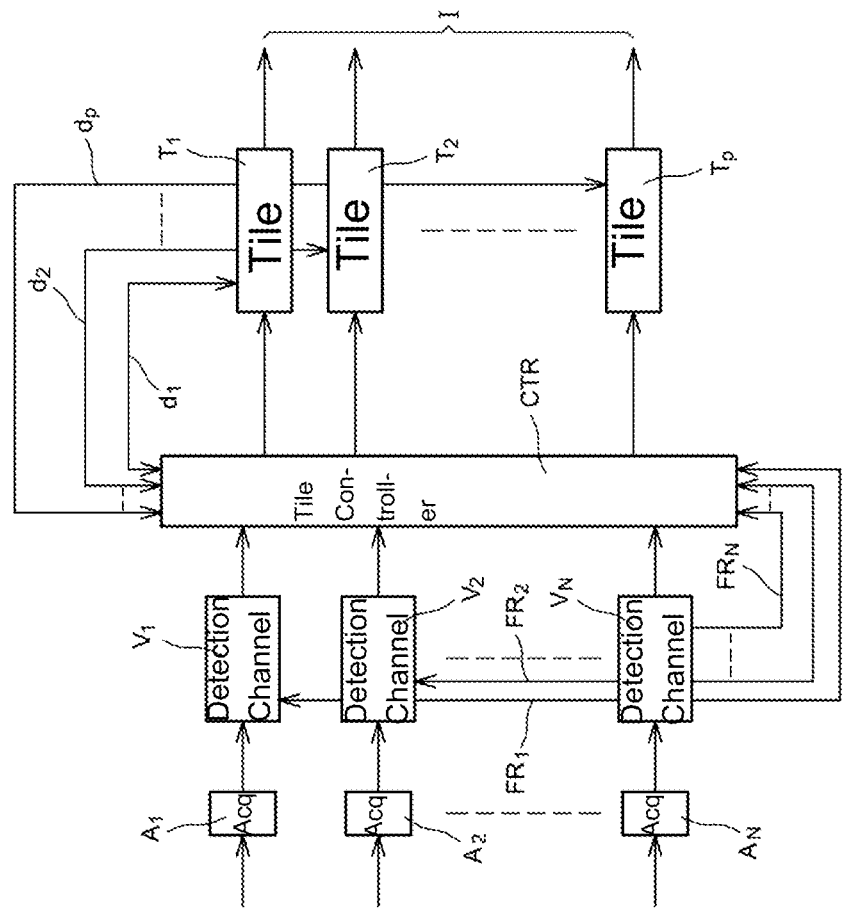
FIG. 2 shows the outline diagram of a signal acquisition or processing device that implements the method of the invention.

FIG. 2 shows the outline diagram of a signal acquisition and processing device that implements the method of the invention.

The device comprises N acquisition channels $A_1, A_2, \ldots, A_N$, N detection channels $V_1, V_2, \ldots, V_N$ associated respectively with the N acquisition channels, N being an integer number greater than or equal to 2, a tile controller CTR and P computing tiles $T_1, T_2, \ldots, T_P$, P being an integer number greater than or equal to 1.

The method of the invention comprises, in succession:
- a step of acquiring signals in at least two acquisition channels in the set of N acquisition channels $A_1, A_2, \ldots, A_N$;
- a step of detection, by means of two detection channels respectively associated with the two acquisition channels, of the signals acquired in the acquisition channels in order to form detected signals;
- a step of distribution, in at least one computing tile in the set of P computing tiles $T_1, T_2, \ldots, T_P$, of the signals detected by the detection channels,
- a step of storage of the detected signals in the computing tile or tiles, and
- a step of processing the signals stored in the computing tile or tiles in order to obtain data I characteristic of the detected signal.

Only one tile controller is depicted in FIG. 2. The invention does however concern other embodiments for which the acquisition and processing device comprises several tile controllers. In the latter case, each tile controller is preferentially allocated to a different management of a set of computing tiles, for example management in streaming mode or management in deferred mode. Preferentially, each tile detector, each tile controller and each computing tile is programmable or reconfigurable.

A detected pulse may be transferred entirely into the same computing tile or by pieces into several computing tiles. In all cases, each detected pulse or detected pulse piece is transferred into an available computing tile—in whole or in part—with a time data item that identifies the start time of the pulse or of the pulse piece and with a channel data item that identifies the detection channel by means of which the pulse was detected. Each computing tile $T_k$ ($k=1, 2, \ldots, P$) indicates its state of availability to the controller CTR by means of a data item $d_k$ that is exchanged between the tile and the controller. When a pulse is divided into pulse pieces, the division is effected at a channel detector, provided that the latter receives the instruction for this by means of a signal $FR_j$ ($j=1, 2, \ldots, N$) coming from the tile controller.

As soon as a pulse or a fraction of a pulse is present in a computing tile, the latter has access to all the data that make up the pulse or the fraction of a pulse and the programmed computations can be done. The computing tiles may be of different natures (programmable components, dedicated components, etc.) and perform different processing operations or be identical and perform identical processing operations. Each pulse or fraction of a pulse is transmitted to a computing tile with complementary information. As will be described in detail subsequently, this complementary information is data necessary for subsequent processing that makes it possible to replace the detected pulses in their context. This complementary information is, for example, the start time of a pulse or of a fraction of a pulse, the number of the detection channel on which a pulse was detected, the standardisation coefficient that was used to digitise the pulse or fraction of a pulse if digitisation took place, etc. The processing time of each computing tile may be variable. In a particular embodiment of the invention, as soon as the duration of the processing reaches a predetermined limit, the processing is interrupted and new signals can then be processed. Each computing tile informs the tile controller of its total or partial availability as soon as a processing is completed or interrupted and a new pulse or fraction of a pulse can then be assigned for processing. In the case where no computing tile is available for processing a new pulse, several solutions can be envisaged:

stopping a current processing in a computing tile in order to process all or part of the new pulse, or choosing not to process the new pulse, or delaying the processing of the new pulse by storing the new pulse.

The computing tiles comprise storage means and computing means. A preferential implementation is a programmable or reconfigurable computing tile. The storage means advantageously make it possible to have available simultaneously all the samples to be processed. Preferentially, the computing means form a processing in accordance with the one described in the French patent application No 2 936 626 entitled "Device for the processing in parallel of a data stream" filed by the Applicant on 30 Sep. 2008.

The computing tiles are mutualised. "Mutualisation" of the tiles means that the same computing tile is able to perform computations on a pulse coming from any detection channel.

Figure 3:
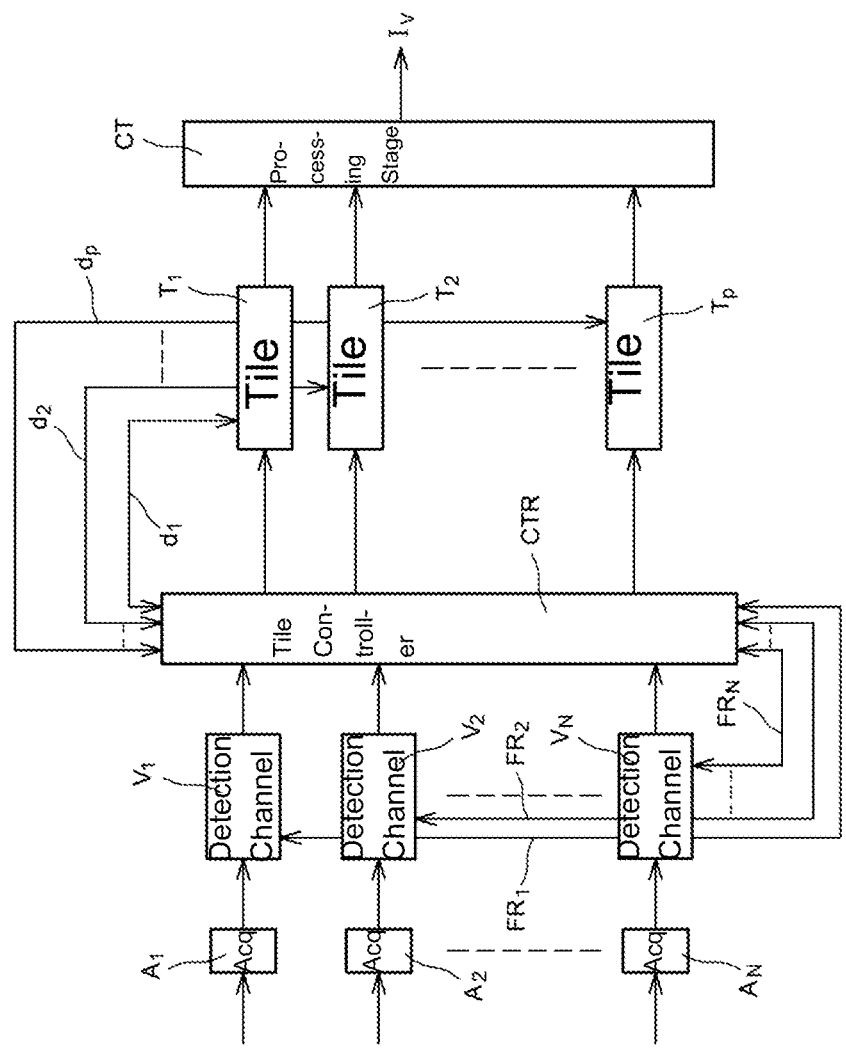
FIG. 3 shows an improvement to the signal acquisition or processing device depicted in FIG. 2.

FIG. 3 depicts an improvement to the data acquisition and processing device depicted in FIG. 2. In addition to the elements mentioned with reference to FIG. 2, the device comprises a processing stage CT that processes the data I delivered by the computing tiles according to the time data and/or channel data. For this purpose, the information for situating the results in their context (channel data, time data, standardisation coefficient, etc.) are transmitted to the processing stage CT with the data I delivered by the computing tiles. The processing performed by the processing stage CT may for example be a grouping or merging of the data I by detection channel and/or according to time. It may thus be a case for example of the construction of a detection histogram as a function of time on one or more detection channels. This grouping or merging of the data delivered by the computing tiles is generally essential in the majority of applications. The processing performed by the processing stage CT makes it possible to obtain a global result structured by detection channel and/or with respect to time from the scattered results obtained at the output of the computing tiles. In a particularly advantageous embodiment of the invention, the processing stage CT provides metrology of the active time.

The processing stage CT can consist of a single computer or a plurality of computers. In a particular embodiment, the processing stage comprises one or more communication modules able to communicate with other components, for example other processing stages of the same or another signal acquisition and processing device. It is then possible to modulate on several processing resources the various processing operations that must be performed from the computing results delivered by the tiles.

Figure 1:
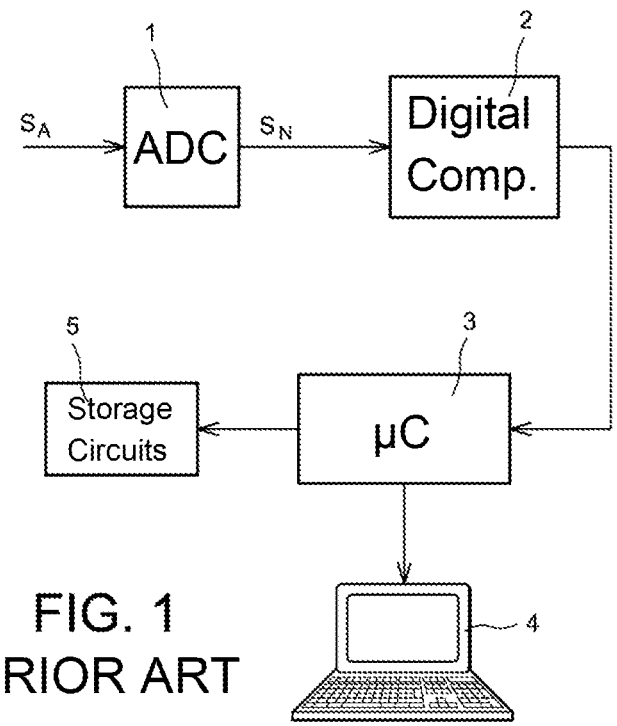
FIG. 1—already described—shows a signal acquisition and processing device of the prior art.
Figure 4:
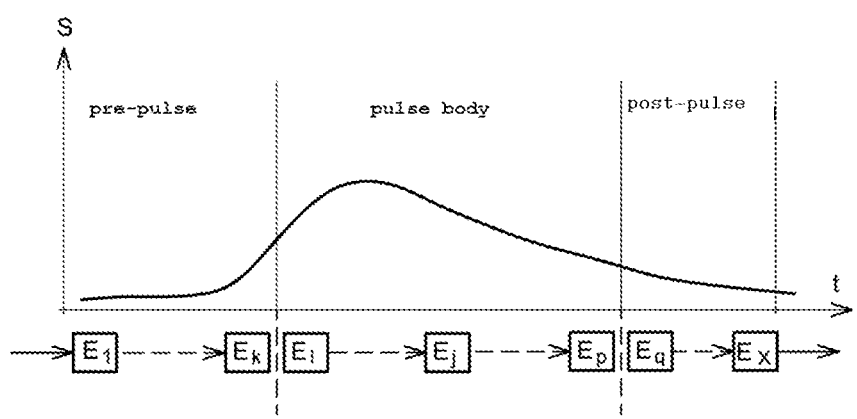
FIG. 4 depicts, symbolically, a detected pulse, its division into various parts and the associated digital samples that result from its digitisation.
Figure 5A:
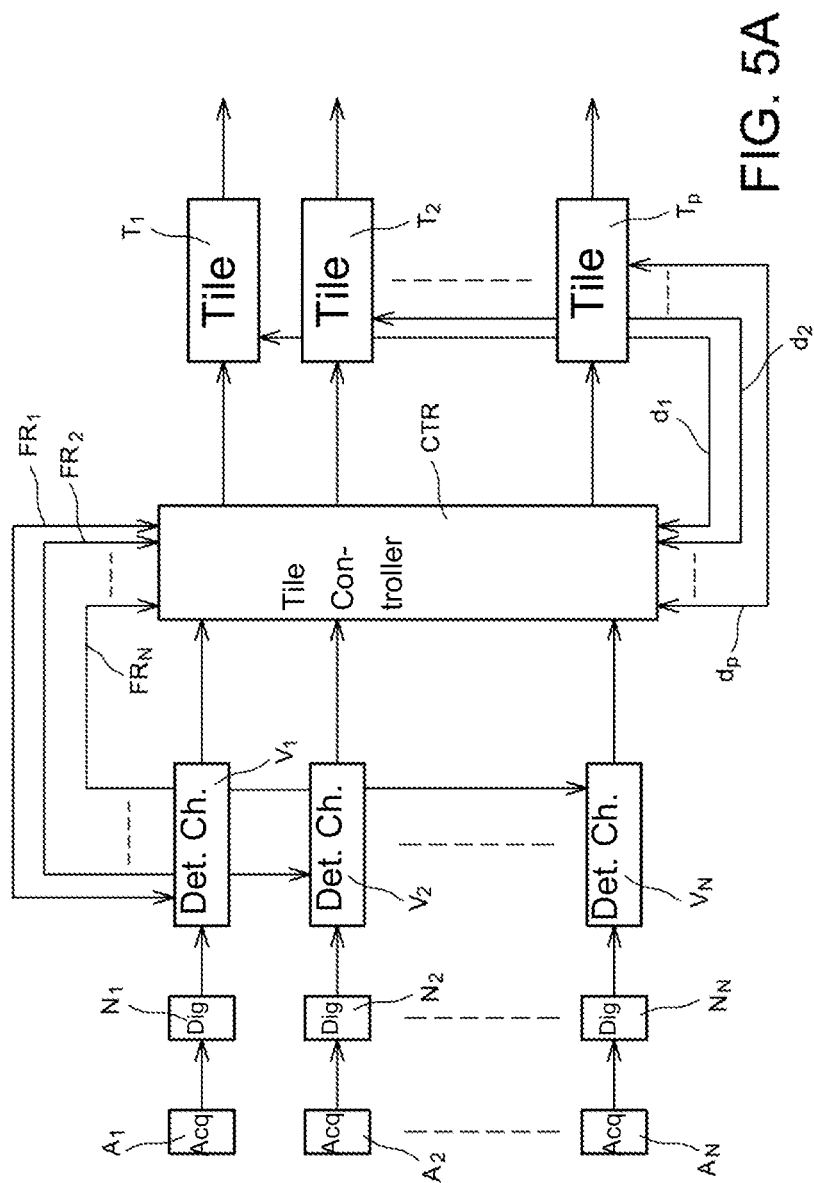

In the preferential embodiment of the invention, the signals processed in the computing tiles are digitised signals. FIG. 4 depicts, by way of example, the time curve of a pulse S(t) and its breakdown into digital samples, and FIGS. 5A-5C depict three variants of an acquisition and processing device able to implement the method according to the preferential embodiment of the invention.

The pulse S(t) comprises three parts: a pre-pulse, a pulse body and a post-pulse. The pre-pulse and the post-pulse contain information useful to the subsequent processing operations (the background noise for example). The pulse body represents the useful signal. Various methods—known per se—can be used to detect the start or end of a pulse. It is possible, for example, to use a detection threshold. It is also possible to detect the end time of a pulse on the basis of the knowledge of the start time, provided that the duration of the pulse is known a priori. FIG. 4 depicts symbolically the series of digital samples associated with the pulse S(t). The pre-pulse is associated with the samples $E_1, \ldots, E_k$. The pulse body is associated with the samples $E_i, \ldots, E_j, \ldots, E_p$. The post-pulse is associated with the samples $E_q, \ldots, E_x$.

The pulses may be digitised at various steps of the method of the invention. According to a first variant, the digitisation is done after the acquisition of the signals and before detection. FIG. 5A illustrates this first variant. Digitisation devices $N_j$ (j=1, 2, . . . , N) and then placed between the acquisition channels $A_j$ and the detection channels $V_j$. According to a second variant, the digitisation is done after the detection and before the distribution of the detected signals in the computing tiles. FIG. 5B illustrates this second variant. Digitisation devices $N_j$ (j=1, 2, . . . , N) are then placed between the acquisition channels $V_j$ and the tile controller CTR. According to the third variant, the digitisation is done after the distribution of the signals and before the processing in the computing channels. FIG. 5C illustrates this third variant. Digitisation devices $N_k$ (k=1, 2, . . . , P) are then placed between the tile controller and the computing tiles.

Figure 6:
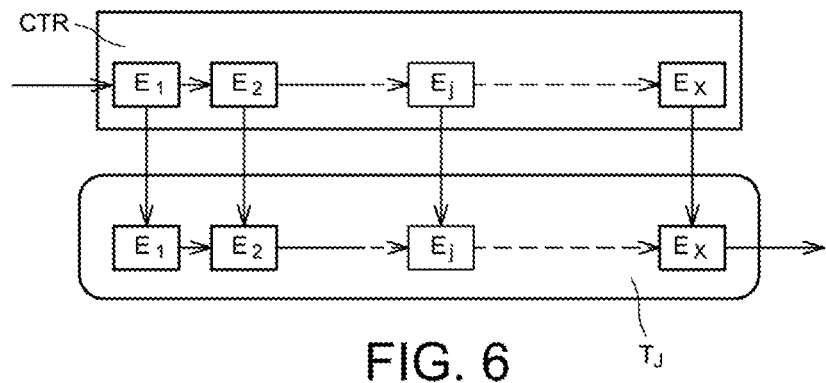
FIG. 6 shows a first variant embodiment of a circuit that participates in an example of a signal acquisition and processing device that implements the method of the invention.

In a first embodiment of the invention, each tile detector $V_j$ comprises storage means and each detected pulse, digitised or not, is entirely stored in the storage means of the tile detector. If the acquired pulses were not digitised before detection, the pulse stored in the channel detector is then digitised and the digitised samples $E_1, \ldots, E_j, \ldots, E_{x-1}, E_x$ issuing from the digitisation are transferred, via the tile controller CTR, into a computing tile $T_k$, where they are once again stored by the tile storage means (cf. FIG. 6).

Figure 7:
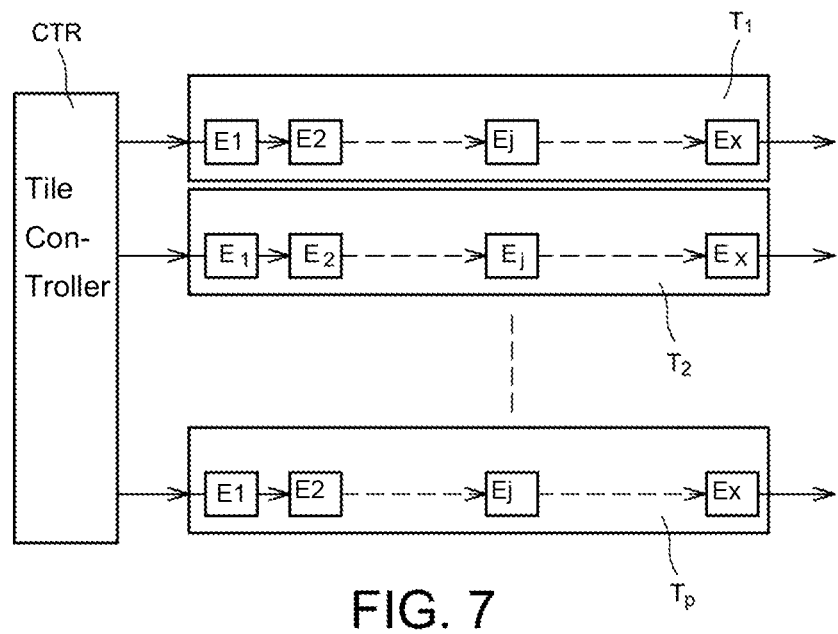
FIG. 7 shows a second variant embodiment of a circuit that participates in an example of a signal acquisition and processing device that implements the method of the invention.

In a second embodiment of the invention, the detection channels do not comprise any storage means. Each detected pulse is digitised as it is acquired or detected and the digital samples $E_1, \ldots, E_j, \ldots, E_{x-1}, E_x$ issuing from the digitisation are transferred into at least one computing tile $T_k$, where they are stored by the tile storage means. This second embodiment advantageously saves on memory resources (cf. FIG. 7). It concerns more particularly integrated applications where the cost of the circuits must be controlled. This embodiment requires permanently having available at least one computing tile available, in whole or in part, to store and process any new pulse of fraction of a pulse. In order to overcome this constraint of availability of the computing tiles, a buffer memory may be placed upstream of the computing tiles, for example in the tile controller, to temporarily store the data that the computing tiles are not able to process because of their unavailability.

In general terms, the function of the tile controller CTR is to transfer the digitised pulses, previously stored or not, into the available computing tiles. For this purpose, each tile $T_k$ delivers to the tile controller CTR information $d_k$ relating to its total or partial availability. A digitised pulse is transferred, sample by sample, into at least one computing tile. In order to ensure rapid storage of the digitised samples, registers are used as storage elements. The registers are concatenated one behind the other, each new sample pushing the sample preceding it into the adjoining register.

Figure 8B:
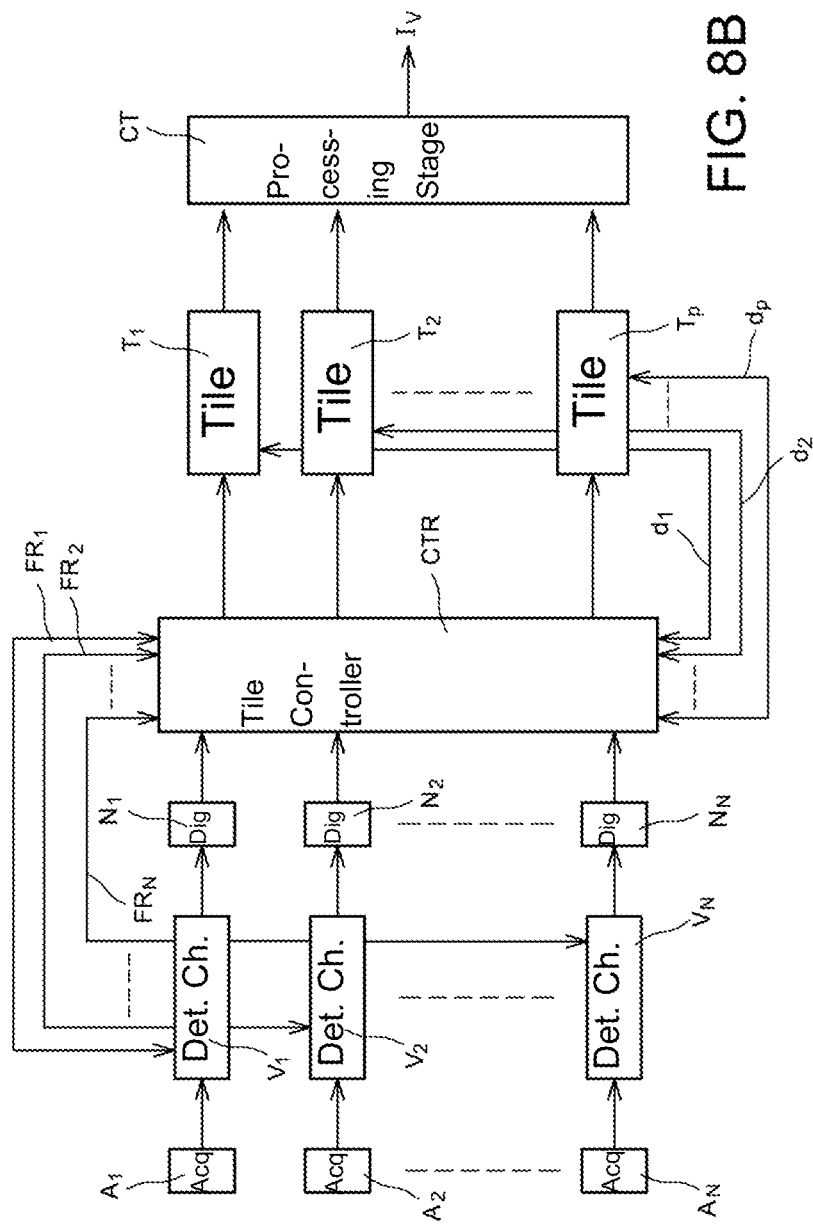
Figure 8C:
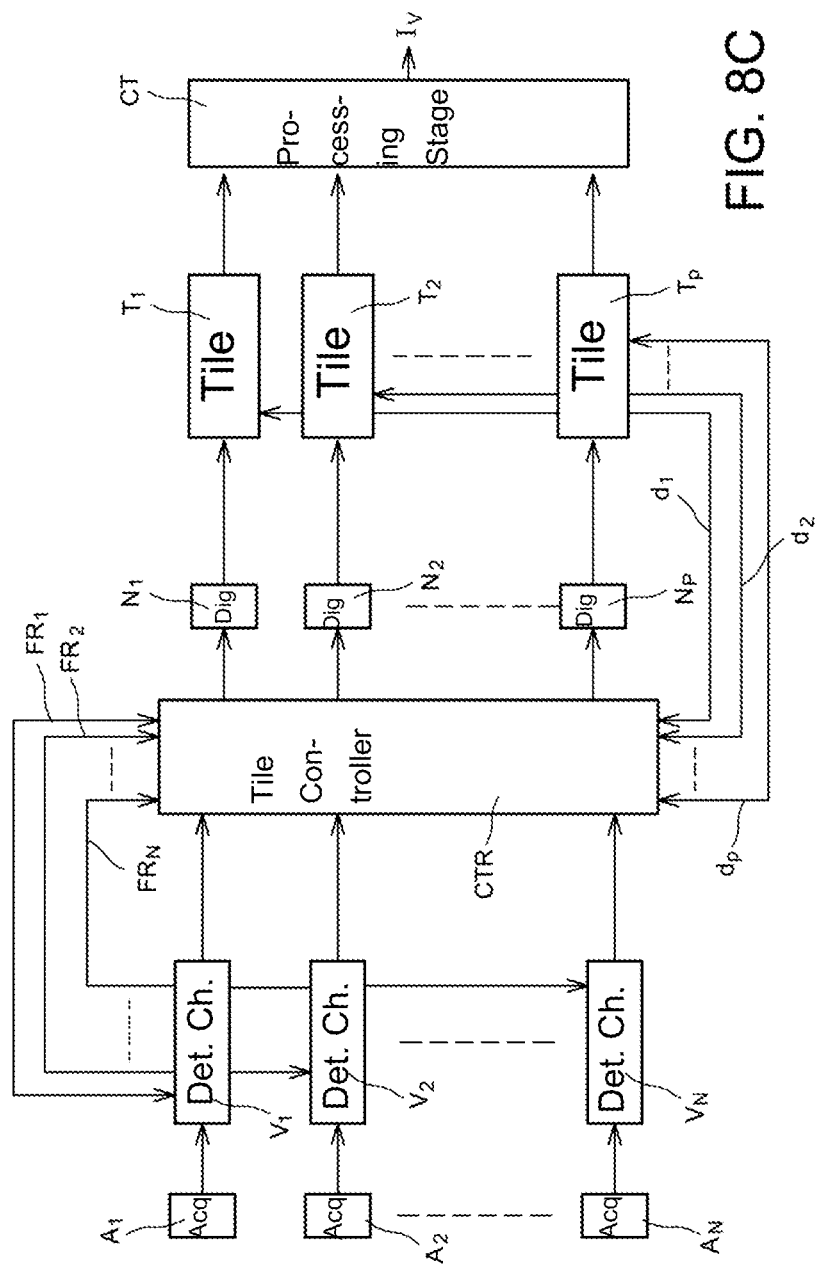

FIGS. 8A-8C depict three variants of a signal acquisition and processing device in accordance with the device depicted in FIG. 3 and which uses the preferential embodiment of the method of the invention. In addition to the elements depicted in FIG. 3, the signal acquisition and processing device comprises digitisation circuits able to digitise the signals before they are processed in the computing tiles. The three variants depicted in FIGS. 8A-8C correspond respectively to the three variants depicted in FIGS. 5A-5C. The digitisation circuits are thus placed either between the acquisition channels and the detection channels (FIG. 8A) or between the detection channels and the tile controller (FIG. 8B) or between the tile controller and the computing tiles (FIG. 8C).

Examples of application of the processing method of the invention will now be described.

Let us take the case for example of a detector A able to generate an electrical pulse at each perceived event (neutron, radiation, radar, ultrasound, etc.). The detector A is able to receive up to 100,000 events per second, each having a duration of 100 ns. Since the arrival of events obeys a Poisson distribution, it is not possible to determine in advance the time difference that separates two successive events. The processing time for each event is expressed by the number of cycles multiplied by the operating frequency FTC of a computing tile. For example, if the processing of the data of channel A requires a complex processing of 10,000 cycles, assuming that the frequency FTC is 200 MHz, that is to say 5 ns/cycle, the processing time for each event therefore takes 50,000 ns. If this processing time is related to the number of events that may occur on channel A and only one computing tile is used that works at a frequency of 200 MHz, processing 100,000 events per second requires 5 seconds, which does not make it possible to fulfil the real-time constraints.

The invention advantageously affords a processing that provides the real-time constraints. This is because the use of six computing tiles at the working frequency 200 MHz makes possible in real-time the processing of all the data received on channel A.

Another example concerns the case of two detection channels A and B. Channel B can receive up to 100,000 events per second, each event having a duration of around 100 milliseconds each, the events detected on channel B being correlated with those detected on channel A. The processing time for channel B is non-deterministic, lying for example between 10 cycles and 1,000 cycles depending on the nature of the data (for this purpose, channel B may contain a filter able to reject a pulse or not, if the latter is judged to be of excessively poor quality). As the data detected by channel A require significant computing resources, the mutualisation of the computing tiles proposed by the method of the invention makes it possible to share the computing resources between various tiles. Thus, if the architecture having six computing tiles is sized for processing data detected by channels A and B, it is possible to process, in real-time, all the data detected. As the computing resources are shared between various tiles for the same detection channel (channel A), it is important to have available information relating to the identification of the channel from which the processed data come. To this end, the computing tile controller that associates the computing tiles with the detection channels transmits, in addition to the data to be processed, information relating to the detection channel from where they come.

In the case of applications where the data detected by channels A and B are correlated, for example correlated in time, it is necessary to make a match between the detected data and the processing results delivered by the computing tiles. As the processing carried out in each computing tile is carried out independently of the others (asynchronous), the information concerning the time of arrival of a data packet to be processed, which is known from the detector and the computing tile controller, is then transmitted to the computing tile. The processing stage CT then reconstitutes in time all the data streams as well as the results that are associated therewith. This makes it possible for example to determine the time that has elapsed between the reception of events detected by channel A and channel B in order to determine, for example, a distance (the case of the radar application).

A third example concerns the case where one or more supplementary channels participate in the detection of data. The device of the invention can in fact comprise, for example, a supplementary channel provided with a sensor C that detects data of a completely different nature from the data detected by the other channels, the processing of the data detected by the sensor C then also being completely different from the processing of the data detected by the other channels. The data detected by the sensor C may for example be denser data than the data detected by the other channels and consequently require a substantially longer processing time than that of the other channels. For this purpose, one or more supplementary computing channels may easily be added to the device of the invention and/or the sizing and/or the operating frequency of existing computing tiles may be modified.

A fourth example consists of determining whether a particle deposits energy in several detectors disposed in a layer and analysing the energy deposited in each detector, the transit times, etc. For this purpose, the detectors disposed in layers are connected to a single multichannel measuring system such as the one of the invention.

When a pulse is detected by a channel, it is dated and identified by its detection channel (unicity of date/channel pair). The date and the samples of the pulse are then transmitted to a computing tile, which determines the characteristics that are particular to the pulse, for example its energy. As the time and channel information is associated with the pulses, it can be transmitted directly to any available computing tile in order to carry out the processing. The processing can also be deferred while awaiting availability of a tile. Once the characteristics of the pulse are determined, for example its energy, they are transmitted to the processing stage CT, which groups together all the results from the computing channels. The processing stage CT produces the correlations between the pulses on the basis of the time and channel information. The processing of the stage CT then consists, for example, of separating the pulses that have not passed through all the detectors from those that have passed through all the detectors. For this purpose, it suffices to consider only the pulses for which the dates are correlated, that is to say included in a time range of a very small predetermined value. It is then possible thereafter to reconstitute, for example, an energy spectrum corresponding to the detected particles or to deduce, on the basis of the energies deposited, characteristics relating to the detected particles such as for example the position of the source emitting the particles.

The invention claimed is:

1. Pulse acquisition and processing method comprising a step of acquiring at least two pulses in at least two acquisition channels ($A_1, A_2, \ldots, A_N$) of a signal acquisition and processing device and a step of detecting the pulses acquired by at least two detection channels ($V_1, V_2, \ldots, V_N$) of the signal acquisition and processing device respectively associated with the acquisition channels, each detection channel delivering a detected pulse corresponding to an acquired pulse, the method additionally comprising:
   a step of distributing, in at least one available computing tile ($T_1, T_2, \ldots, T_p$), in whole or in part, in a set of computing tiles, at least one pulse detected by at least one detection channel, the detected pulse being distributed in the form of successive temporal samples in the computing tile or tiles, each temporal sample being accompanied by a time data item that identifies a start time of the temporal sample and a channel data item that identifies the acquisition channel from which the temporal sample comes,
   a step of storing the temporal samples in the computing tile or tiles in the set of computing tiles,
   a step of processing the temporal samples stored in the computing tile or tiles in order to obtain characteristic data (I) of the pulses detected, each characteristic data item (I) being associated with at least one time data item and at least one channel data item, and
   a step of supplementary processing of all or some of the characteristic data of the detected pulses (I) that processes said characteristic data (I) according to time data and/or channel data that are associated with the characteristic data,
   wherein the supplementary processing step groups together all or some of the characteristic data (I) by detection channel and/or according to time.

2. Pulse acquisition and processing method according to claim 1 and which further comprises a step of digitising ($N_1, N_2, \ldots, N_N$) the acquired pulses that precedes the detection step.

3. Pulse acquisition and processing method according to claim 1 and which further comprises a step of digitising ($N_1, N_2, \ldots, N_N$) the detected pulse that precedes the distribution step.

4. Pulse acquisition and processing method according to claim 1 and which further comprises a step of digitisation ($N_1, N_2, \ldots, N_P$) of the temporal samples that precedes the step of storing the temporal samples.

5. Pulse acquisition and processing method according to claim 1, wherein the detected pulses are stored in the detection channels.

6. Pulse acquisition and processing method according to claim 1, wherein the supplementary processing step that groups together all or some of the characteristic data (I) by detection channel is a step of constructing a detection histogram by detection channel and/or according to time.

7. Pulse acquisition and processing method according to claim 1, wherein the temporal samples are entirely stored in the same computing tile.

8. Pulse acquisition and processing method according to claim 1, wherein, when the processing of the temporal samples stored occupies all the computing tiles in the set of computing tiles and at least one additional pulse is detected in at least one detection channel:
   the current processing in at least one computing tile is interrupted in order to process supplementary stored temporal pulses corresponding to the supplementary detected pulse, or
   it is chosen not to process the supplementary pulse, or
   it is chosen to delay the processing of the supplementary pulse until at least one computing tile is wholly or partly available.

9. Pulse acquisition and processing method according to claim 1, wherein the processing of the stored temporal samples is interrupted in at least one computing tile as soon as the duration of said processing exceeds a predefined value or as soon as a detected pulse is considered to have priority, the processing of the pulse considered having priority then being substituted for the interrupted processing.

10. Pulse acquisition and processing method according to claim 1, wherein a pulse is an event in a set of events obeying a Poisson distribution.

* * * * *